(12) United States Patent
Tsai et al.

(10) Patent No.: US 11,977,302 B2
(45) Date of Patent: May 7, 2024

(54) CHOLESTERIC LIQUID CRYSTAL DISPLAY DEVICE AND DRIVING METHOD FOR IMPROVING NON-UNIFORM IMAGE QUALITY OF CHOLESTERIC LIQUID CRYSTAL DISPLAY DEVICE

(71) Applicant: IRIS OPTRONICS CO., LTD., Tainan (TW)

(72) Inventors: Ming-Liang Tsai, Tainan (TW); Wu-Chang Yang, Tainan (TW); Chi-Chang Liao, Tainan (TW)

(73) Assignee: IRIS OPTRONICS CO., LTD., Tainan (TW)

( * ) Notice: Subject to any disclaimer, the term of this patent is extended or adjusted under 35 U.S.C. 154(b) by 5 days.

(21) Appl. No.: 18/078,079

(22) Filed: Dec. 8, 2022

(65) Prior Publication Data

US 2023/0185136 A1 Jun. 15, 2023

(30) Foreign Application Priority Data

Dec. 9, 2021 (TW) .................................. 110146033

(51) Int. Cl.
*G02F 1/133* (2006.01)
*G02F 1/1343* (2006.01)
(Continued)

(52) U.S. Cl.
CPC .... *G02F 1/134309* (2013.01); *G02F 1/13306* (2013.01); *G02F 1/137* (2013.01); *G02F 1/1391* (2013.01)

(58) Field of Classification Search
CPC .... G02F 1/133; G02F 1/13306; G02F 1/1343; G02F 1/134309; G02F 1/1362;
(Continued)

(56) References Cited

U.S. PATENT DOCUMENTS

| 9,001,281 B2 | 4/2015 | Lin et al. | |
|---|---|---|---|
| 2010/0188380 A1* | 7/2010 | Nose | G09G 3/3629 |
| | | | 345/209 |

(Continued)

FOREIGN PATENT DOCUMENTS

| CN | 104749804 A | 7/2015 |
|---|---|---|
| TW | 201126482 A1 | 8/2011 |
| TW | 201415446 A | 4/2014 |

*Primary Examiner* — Thoi V Duong
(74) *Attorney, Agent, or Firm* — Cheng-Ju Chiang

(57) ABSTRACT

A cholesteric liquid crystal display device and a driving method for improving non-uniform image quality of the cholesteric liquid crystal display device. The cholesteric liquid crystal display device includes a cholesteric liquid crystal display panel and a liquid crystal drive unit. The cholesteric liquid crystal display panel is composed of multiple row circuit structures and multiple column circuit structures. The liquid crystal driving unit sequentially outputs column driving voltages to a plurality of column circuit structures in a scanning manner. After scanning the multiple column circuit structures, the liquid crystal driving unit applies an unselected voltage to the multiple column circuit structures together with more than 18 times the scanning unit time course, so as to make the brightness of the overall picture more uniform.

6 Claims, 5 Drawing Sheets

(51) Int. Cl.
*G02F 1/137* (2006.01)
*G02F 1/139* (2006.01)

(58) Field of Classification Search
CPC .. G02F 1/136286; G02F 1/137; G02F 1/1391; G02F 1/1396; G09G 2300/0486; G09G 3/3622; C09K 19/02
See application file for complete search history.

(56) References Cited

U.S. PATENT DOCUMENTS

| | | |
|---|---|---|
| 2020/0073036 A1 | 3/2020 | Wee et al. |
| 2021/0036046 A1 | 2/2021 | Kwon et al. |

\* cited by examiner

CHOLESTERIC LIQUID CRYSTAL DISPLAY DEVICE AND DRIVING METHOD FOR IMPROVING NON-UNIFORM IMAGE QUALITY OF CHOLESTERIC LIQUID CRYSTAL DISPLAY DEVICE

BACKGROUND OF THE INVENTION

1. Field of the Invention

The present invention relates to a cholesteric liquid crystal display, and in particular, to a cholesteric liquid crystal display device and a driving method for improving non-uniform image quality of the cholesteric liquid crystal display device.

2. Description of Related Art

A cholesteric liquid crystal display device includes a cholesteric liquid crystal display panel, and the cholesteric liquid crystal display panel has pixels where are intersected between a plurality of column electrode lines and a plurality of row electrode lines. It's called a Passive Matrix.

Driver chips usually output column driving voltages to a plurality of column electrode line and output row driving voltages to address (scan) a plurality of row electrode lines in a sequence. The row driving voltage includes a select voltage and a non-select voltage.

It takes a Row Scan Time to scan a row electrode line, and it takes batch scan time to scan all row electrode lines. The batch scan time is the total of all Row Scan Times. If it takes a scan unit time for select voltage to address a row electrode line, it's called a select unit time (Tselect); if it takes another scan unit time for non-select voltage to address a row electrode line, it's called a non-select unit time (Tnon-select).

Referring to FIG. 1, it shows a schematic of a cholesteric liquid crystal display panel 01 in the prior art. The cholesteric liquid crystal display panel 01 as shown in FIG. 1 has M row electrode lines 02 in total, as denoted by Row1, Row2, . . . , Row(M-1), Row(M) and N column electrode lines 04 in total, as denoted by Col 1, . . . , Col(N). The M row electrode lines 02 are scanned by a select voltage of the row driving voltage from Row1, Row2, . . . , to Row(M-1), and Row(M) in sequence.

Referring to Table 1, it shows the batch scan times for each row electrode line 02. After all batch scan are completed, each batch scan time for each row electrode line 02 is as shown in Table 1:

TABLE 1

| row electrode line | batch scan time |
| --- | --- |
| Row1 | Tselect + (M-1)*Tnon-select |
| Row2 | 1*Tnon-select + Tselect + (M-2)*Tnon-select |
| . . . | . . . |
| Row(M-1) | (M-2)*Tnon-select + Tselect + 1*Tnon-select |
| Row(M) | (M-1)*Tnon-select + Tselect + 0 |

As shown in Table 1, it illustrates that accumulative non-select times are (M-1)*Tnon-select, (M-2)*Tnon-select, . . . , 1*Tnon-select, and 0 (zero) in decreasing order after the row electrode line 02 is scanned by the select voltage from Row1, Row2, . . . , Row(M-1), Row(M).

Specifically, the non-select times are underlined, and it's obvious that accumulative non-select times are getting shorter and shorter from Row1 to Row(M) after the row electrode line 02 is scanned. Thus, orientations of the liquid crystal molecules are different because voltage built-up at the liquid crystal molecules are different so that liquid crystal reflectivity seems higher and brightness seems higher by viewer's eyes. Image quality of the cholesteric liquid crystal display panel is non-uniform.

Therefore, to overcome disadvantages mentioned above, the present invention provides a cholesteric liquid crystal display device and a driving method for improving non-uniform image quality of the cholesteric liquid crystal display device. The disadvantages mentioned above has become one of sought-after technical issue in this field of technology.

SUMMARY OF THE INVENTION

MOM The present invention provides a cholesteric liquid crystal display device and a driving method for improving non-uniform image quality of the cholesteric liquid crystal display device so that brightness of the cholesteric liquid crystal display device is much more uniform and image quality is much more consistent.

To achieve one or more advantages mentioned above, the present invention provides a cholesteric liquid crystal display device which includes a cholesteric liquid crystal display and a liquid crystal driving unit.

The cholesteric liquid crystal display panel includes a plurality of column electrode lines (column) and a plurality of row electrode lines (row).

The liquid crystal driving unit is electrically coupled to the cholesteric liquid crystal display panel, and outputs column driving voltages to a plurality of column electrode lines. A plurality of row electrode lines are addressed (scanned) by row driving voltages in sequence, and while one of the row electrode lines is addressed, it takes a select unit time to address the row electrode line, and the row driving voltages includes a select voltage and a non-select voltage.

Furthermore, after the row electrode lines are addressed by the liquid crystal driving unit, it takes more than eighteen times of the scan unit times for the liquid crystal driving unit to address the row electrode lines by the non-select voltage so as to make image quality much more consistent and uniform.

Additionally, the cholesteric liquid crystal display panel may be a Passive Matrix addressed cholesteric liquid crystal display panel.

According to another embodiment of the present invention, it illustrates a cholesteric liquid crystal display device which includes a cholesteric liquid crystal display panel and a liquid crystal driving unit.

The cholesteric liquid crystal display panel includes a plurality of column electrode lines and a plurality of row electrode lines. The liquid crystal driving unit is electrically coupled to the cholesteric liquid crystal display panel, and further includes a control module.

The liquid crystal driving unit outputs column driving voltages to a plurality of column electrode lines while a plurality of row electrode lines are addressed by the row driving voltages in sequence. While a row electrode line is addressed, it takes a select unit time to address one of the row electrode lines, and the row driving voltages includes a select voltage and a non-select voltage.

Furthermore, after the row electrode lines are addressed by the liquid crystal driving unit, it takes a modification time increment for the control module to address the row electrode lines by the non-select voltage, and the modification time increment is more than eighteen times of the select unit times to so as to make image quality much more consistent and uniform.

Additionally, the cholesteric liquid crystal display panel may be a Passive Matrix addressed cholesteric liquid crystal display panel.

Besides, according to other embodiment, the present invention provides a driving method for improving non-uniform image quality of the cholesteric liquid crystal display device. The cholesteric liquid crystal display device includes a liquid crystal driving unit and a cholesteric liquid crystal display panel which includes a plurality of column electrode lines and a plurality of row electrode lines. The driving method includes steps in the following:

To begin with, column driving voltages are applied to a plurality of column electrode lines while a plurality of row electrode lines are addressed (scanned) by the row driving voltages in sequence. While a row electrode line is addressed, it takes a select unit time to address the row electrode line, and the row driving voltages includes a select voltage and a non-select voltage.

Furthermore, after the row electrode lines are addressed by the liquid crystal driving unit, it takes more than eighteen (18) times of the scan unit times for the control module to address the row electrode lines by the non-select voltage to make image quality much more consistent and uniform.

Additionally, the cholesteric liquid crystal display panel may be a Passive Matrix addressed cholesteric liquid crystal display panel.

Therefore, the present invention provides a cholesteric liquid crystal display device and a driving method for improving non-uniform image quality of the cholesteric liquid crystal display device. After the row electrode lines are addressed (scanned) by the liquid crystal driving unit, it takes more than eighteen (18) times of the scan unit times for the liquid crystal driving unit to address the row electrode lines by the non-select voltage to make brightness of image much more consistent and image quality much more uniform.

The aforementioned illustrations are exemplary for the purpose of further explaining the scope of the present invention. Other objectives and advantages related to the present invention will be illustrated in the subsequent descriptions and appended drawings.

BRIEF DESCRIPTION OF THE DRAWINGS

These and other objectives of the present invention will no doubt become obvious to those of ordinary skill in the art after reading the following detailed description of the preferred embodiment that is illustrated in the various figures and drawings.

DETAILED DESCRIPTION OF THE PREFERRED EMBODIMENTS

The aforementioned constructions and associated functions and following detailed descriptions are exemplary for the purpose of further explaining the scope of the present invention. Other objectives and advantages related to the present invention will be illustrated in the subsequent descriptions and appended drawings. Furthermore, the present invention may be embodied in various modifications, and descriptions and illustrations are not-limiting.

It should be understood that the term used herein in embodiments to describe direction in terms of "central", "lateral", "up", "down", "right", "left", "upright", "horizontal", "top", "bottom", "inside", and "outside" are used to illustrate the present invention and for clarity. It does not hint or imply that device or part mentioned should be assembled or operated in specific direction or setting. Thus, the terms used herein to describe direction are not limiting. In addition, terms "first", and "second" is for descriptive purpose, and is not construed to or implies amount as described in technical feature of the present invention. Technical features with limitation terms "first" or "second" would illustrate or imply that one or more technical features can be included. As to detailed description of the present invention, the term "more" indicates two or more unless expressly indicated otherwise.

As to detailed descriptions of the present invention, it will be further explained that the term "assemble", "connected to", "connected" should be construed in broadest way, unless the context clearly indicates otherwise. For example, the term "connected" indicates that two parts may be "fixed connected" or "detachably connected" or "integrally connected". Similarly, the term "connected" also indicates that two parts may be "mechanically connected" or "electrically connected", and "directly connected", "connected by intermediate part" or "internally connected by two parts". Alterations or modifications of the terms mentioned above will be no doubt understood and obvious to those of ordinary skill in the art The terminology used herein is for the purpose of describing embodiments only and is not intended to limit the full scope of the present invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, or components and the like, but do not preclude the presence or addition of one or more other features, integers, steps, operations, elements, components, and/or groups thereof.

Figure 1:
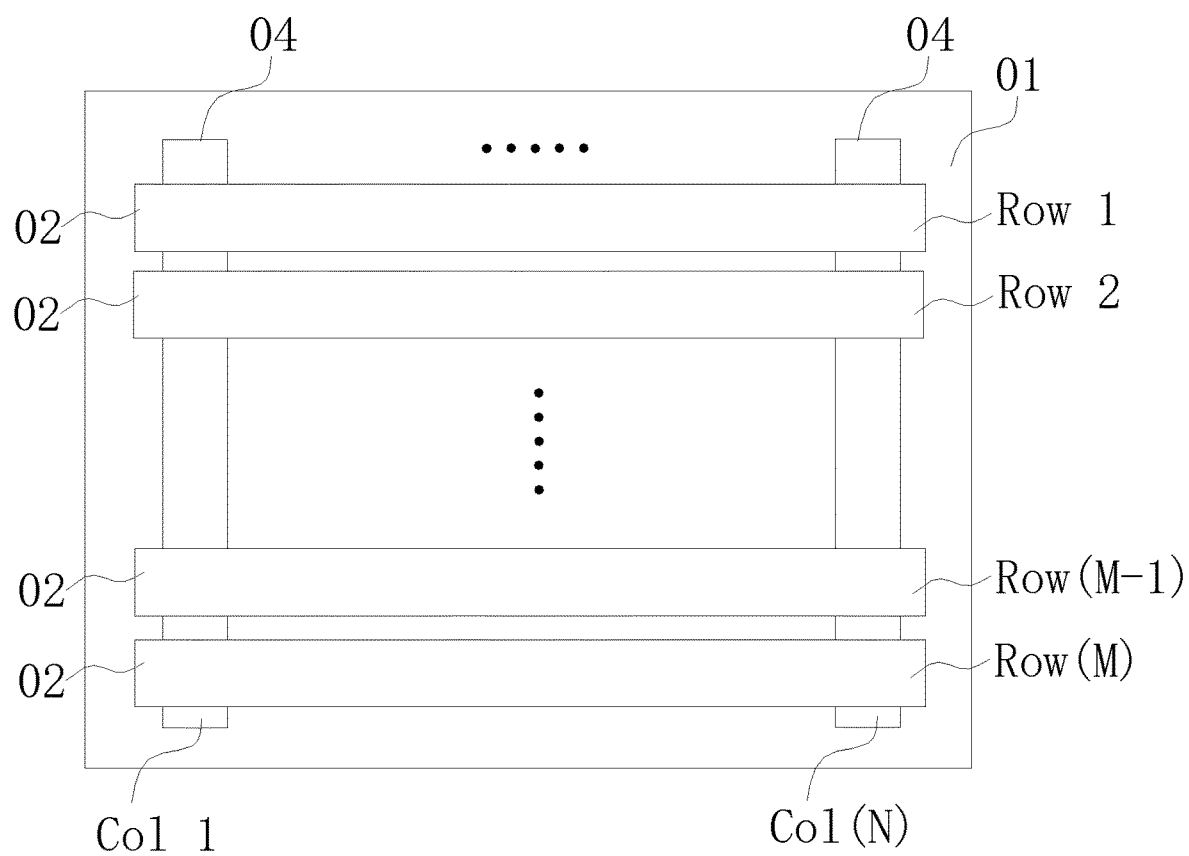
FIG. 1 is a schematic of a cholesteric liquid crystal display panel in the prior art.
Figure 2:
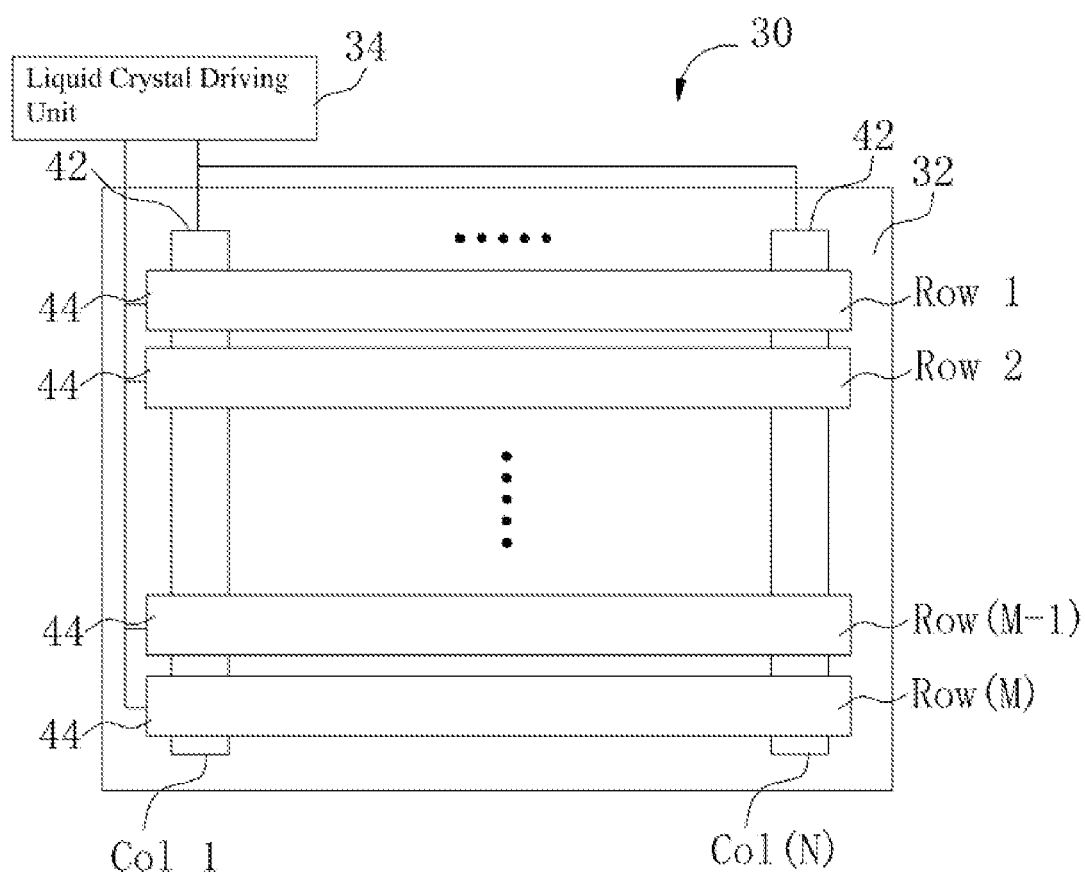
FIG. 2 is a schematic of a cholesteric liquid crystal display device according to the first embodiment of the present invention.

Referring to FIG. 2, it shows a schematic of a cholesteric liquid crystal display device according to the first embodiment of the present invention. To achieve one or more advantages mentioned above, the present invention provides a cholesteric liquid crystal display device 30 which includes a cholesteric liquid crystal display panel 32 and a liquid crystal driving unit 34.

The cholesteric liquid crystal display panel 32 has a plurality of column electrode lines (column) 42 and a plurality of row electrode lines (row) 44. As shown in FIG. 2, the cholesteric liquid crystal display panel 32 has M row electrode lines 44, as denoted by Row1, Row2, . . . , Row(M-1), Row(M) and N column electrode lines 42, as denoted by Col 1, . . . , Col(N).

The liquid crystal driving unit 34 is electrically coupled to the cholesteric liquid crystal display panel 32, and outputs column driving voltages to a plurality of column electrode lines 42 while a plurality of row electrode lines are addressed (scan) by the row driving voltages in sequence. It takes a scan unit time to address a row electrode line 44, and the row driving voltages includes a select voltage and a non-select voltage. Because of the select voltage, cholesteric liquid crystal molecules are driven into "Select Phase" to switch between two stable states. Besides, while the cholesteric liquid crystal molecules are applied by the non-select voltage, the liquid crystal molecules will be driven into "Non-Select Phase" and maintained at that stable state.

Besides, after the liquid crystal driving unit 34 addresses (scans) a plurality of row electrode lines 44, i.e. after the last row electrode line 44 is addressed by the select voltage, it takes more than eighteen (18) times of scan unit time for the liquid crystal driving unit 34 to apply the non-select voltages to a plurality of row electrode lines 44. Thus, the cholesteric liquid crystal molecules are driven to switch states because of sufficient energy to make image quality much more uniform.

Additionally, the cholesteric liquid crystal display panel 32 may be a Passive Matrix addressed cholesteric liquid crystal display panel.

Figure 3:
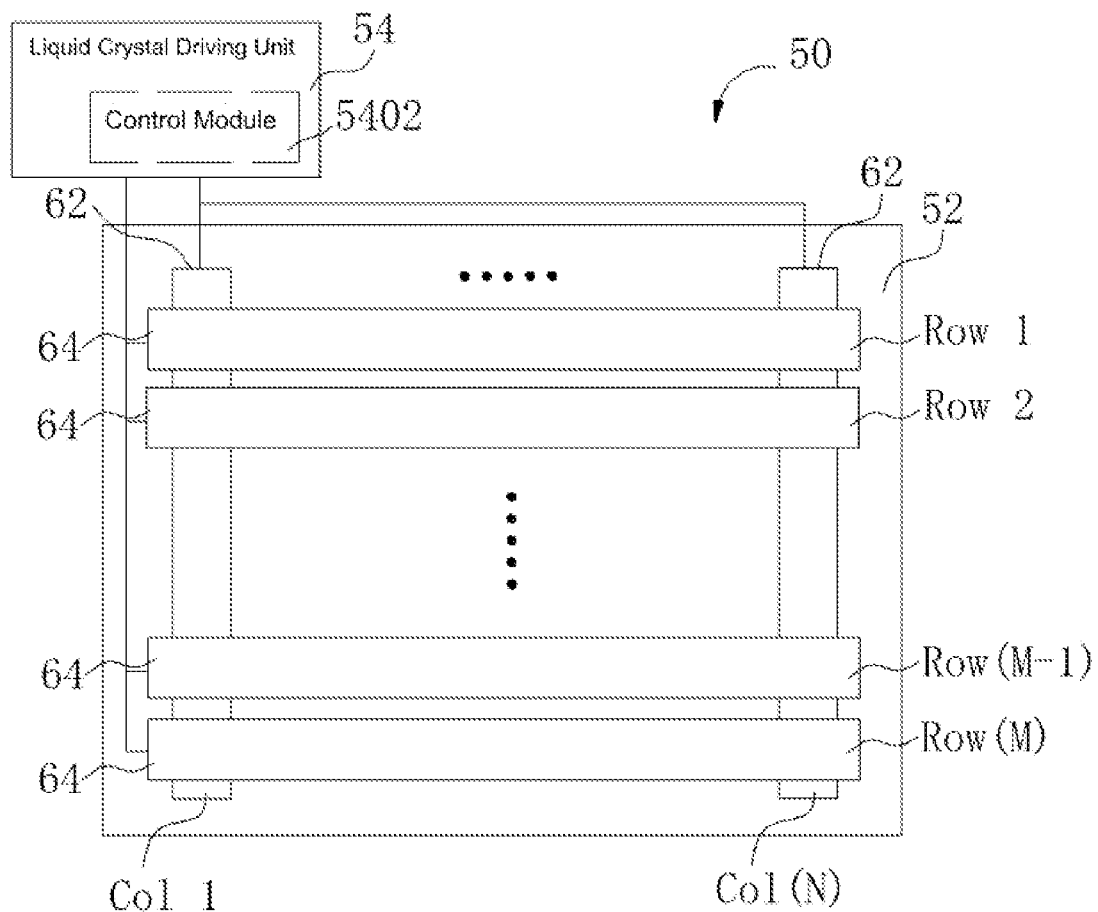
FIG. 3 is a schematic of a cholesteric liquid crystal display device according to the second embodiment of the present invention.

Referring to FIG. 3, it illustrates a schematic of a cholesteric liquid crystal display device 50 according to the second embodiment of the present invention. In another embodiment, the present invention also relates to the cholesteric liquid crystal display device 50 which includes a cholesteric liquid crystal display panel 52 and a liquid crystal driving unit 54.

The cholesteric liquid crystal display panel 52 has a plurality of column electrode lines 62 and a plurality of row electrode lines 64. As shown in FIG. 3, the cholesteric liquid crystal display panel 52 has M row electrode lines 64, as denoted by Row1, Row2, . . . , Row(M-1), Row(M), and N column electrode lines 62, as denoted by Col 1, . . . , Col(N). The liquid crystal driving unit 54 is electrically coupled to the cholesteric liquid crystal display panel 52 which further includes a control module 5402. Referring to FIGS. 2 and 3, and further referring to Table 2 in the following.

TABLE 2

| Row Electrode Line | Batch Scan Time | | | |
| --- | --- | --- | --- | --- |
| | Non-Select Unit Time | Select Unit Time | Non-Select Unit Time | Modification Time Increment |
| Row1 | 0 | Tselect | (M-1)*Tnon-select | Tnon-select-add |
| Row2 | 1*Tnon-select | Tselect | (M-2)*Tnon-select | Tnon-select-add |
| . . . | . . . | . . . | . . . | . . . |
| Row(M-1) | (M-2)*Tnon-select | Tselect | 1*Tnon-select | Tnon-select-add |
| Row(M) | (M-1)*Tnon-select | Tselect | 0 | Tnon-select-add |

The liquid crystal driving unit 54 outputs column driving voltages to a plurality of column electrode lines 62, and outputs row driving voltages to address a plurality of row electrode lines 64 in row-by-row basis (in sequence), i.e., the select voltages of the row driving voltages are applied from Row1, Row2, . . . , Row(M-1), and Row(M). It takes a scan unit time to address one of the row electrode lines 64, and it takes a batch scan time to address all the row electrode lines 64. Thus, the batch scan time is a total amount of all scan unit times.

The row driving voltages mentioned above may include a select voltage and a non-select voltage. Liquid crystal molecules are driven to the select phase with application of the select voltages so that the liquid crystal molecules can be switched between two stable states. Besides, the liquid crystal molecules are maintained at that stable state with application of the non-select voltages. If it takes a scan unit time to address one of the row electrode lines 64 by applying the select voltage, then the scan unit time is called a select unit time (Tselect); If it takes a scan unit time to address one of the row electrode lines 64 by applying the non-select voltage, then the scan unit time is called a non-select unit time (Tnon-select).

Furthermore, the batch scan time of the present invention further includes a modification time increment (Tnon-select-add). Thus, the batch scan time of the present invention may be divided into a non-select unit time, a select unit time, a non-select unit time, and a modification time increment. The modification time increment is more than eighteen (18) times of the scan unit time.

Additionally, after the liquid crystal driving unit 54 addresses (scans) a plurality of row electrode lines 64, i.e., the last one of the row electrode line 64 is addressed by the select voltage, the control module 5402 outputs a modification time increment to the row electrode lines 64 by the non-select voltages as well. As shown in Table 2, the Modification Time Increment Tnon-select-add is larger than product of eighteen and the Non-Select Unit Time Tnon-select (18*Tnon-select) so that sufficient energy is supplied to all liquid crystal molecules to make image quality much more uniform.

Additionally, the cholesteric liquid crystal display panel 152 may be a Passive Matrix addressed cholesteric liquid crystal display panel.

Figure 4:
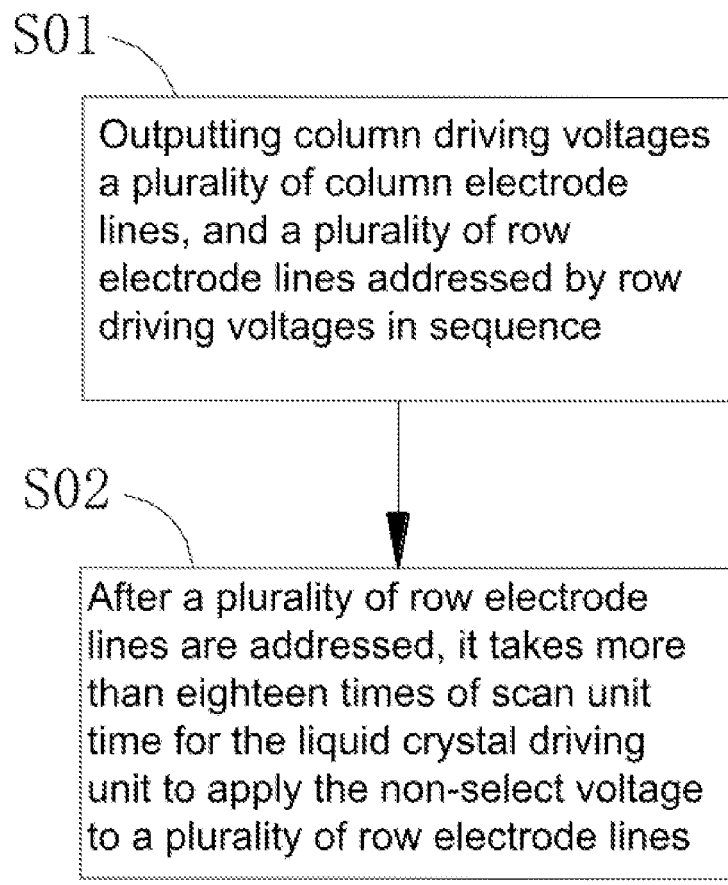
FIG. 4 is a flowchart of a driving method for the cholesteric liquid crystal display device of the present invention.

Referring to FIG. 4, it illustrates a flowchart of a driving method for a cholesteric liquid crystal display device of the present invention. In addition, in another embodiment, the present invention also provides a driving method for improving non-uniform image quality of the cholesteric liquid crystal display device. The cholesteric liquid crystal display device includes a liquid crystal driving unit, and a cholesteric liquid crystal display panel, and the cholesteric liquid crystal display panel includes a plurality of column electrode lines and a plurality of row electrode lines. The driving method for the cholesteric liquid crystal display device includes steps as follows:

Step 01: To begin with, column driving voltages are outputted to a plurality of column electrode lines, and a plurality of row electrode lines are addressed (scanned) by row driving voltages in sequence. It takes a scan unit time to address a row electrode line, and the row driving voltages include a select voltage and a non-select voltage. Because of application of the select voltage, the cholesteric liquid crystal molecules are driven into "Select Phase" to switch between two stable states. Besides, the liquid crystal molecules are maintained at that stable state with application of the non-select voltage, and then the driving method proceeds to Step 02.

Step 02: After a plurality of row electrode lines are addressed (scanned), i.e. the last row electrode line is addressed by the select voltage, it takes more than eighteen (18) times of scan unit time for the liquid crystal driving unit to apply the non-select voltage to a plurality of row electrode lines. Thus, the cholesteric liquid crystal molecules are able to switch states because of sufficient energy to make image quality much more uniform.

Additionally, the cholesteric liquid crystal display panel may be a Passive Matrix addressed cholesteric liquid crystal display panel.

Figure 5:
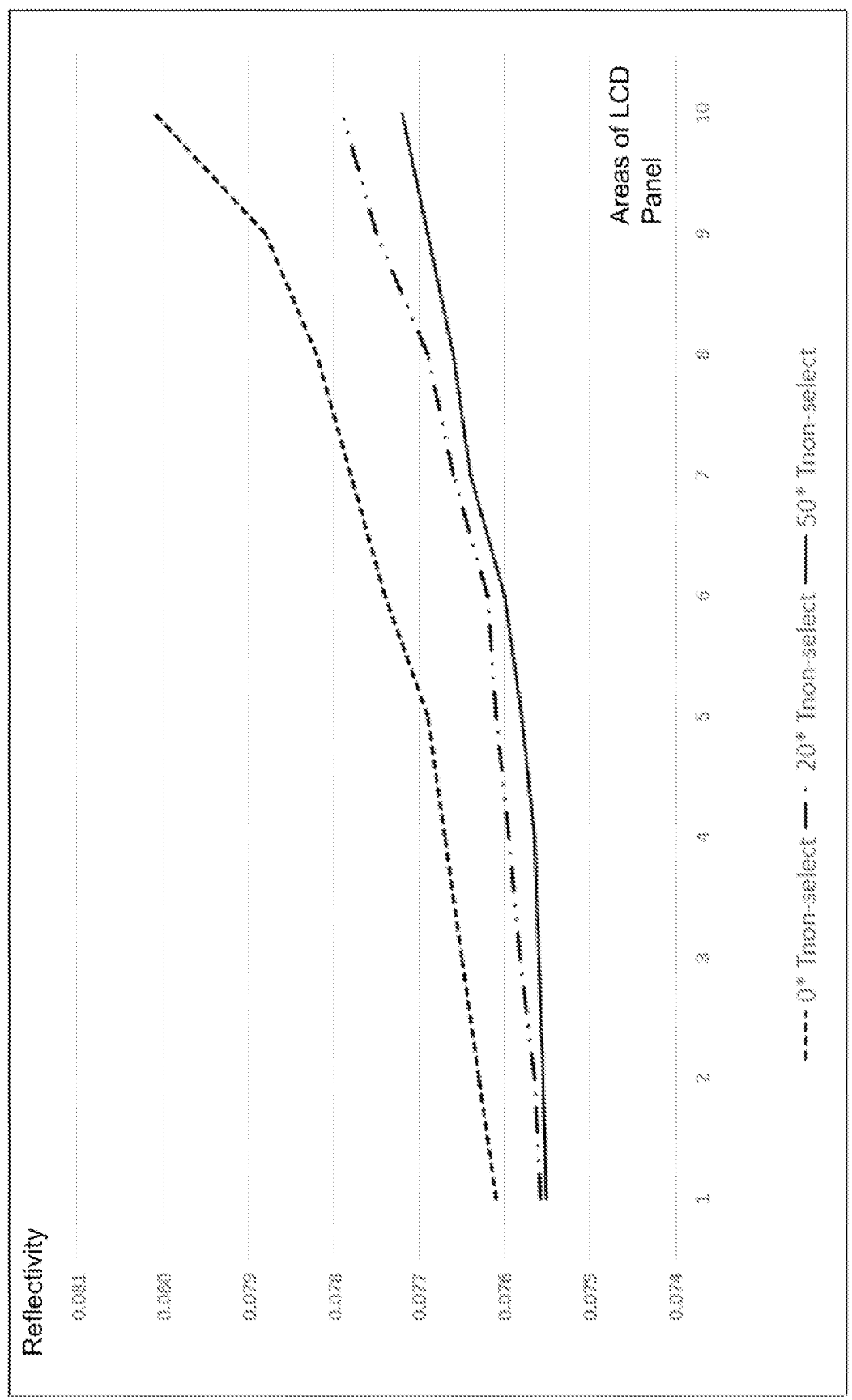
FIG. 5 is a graph of three curves, illustrating how reflectivity are affected by three modification time increment of the present invention.

Referring to FIG. 5, it shows three reflectivity curves, and illustrates how the curves are affected by three modification time increments of the present invention. X-axis coordinate of the graph of FIG. 5 represents that the cholesteric liquid crystal display panel is divided into 10 areas (numeral 1~10). Together with FIGS. 2 and 3, 10 areas of Y-axis coordinate of FIG. 5 represent row 1~row 10, and Y-axis coordinate of the graph of FIG. 5 represents reflectivity. The higher reflectivity is, the brighter the image becomes. Flat curve of the reflectivity as shown in FIG. 5 is desired. Steeper curve of FIG. 5 indicates that differences between bright spots and dark spots are discernible, and image quality is non-uniform.

As shown in FIG. 5, it illustrates three reflectivity curves, which are affected by the three modification time increments. The reflectivity curves are affected by three modification time increments (Tnon-select-add), i.e., zero (0) times of non-select unit time (0*Tnon-select), twenty (20) times of non-select unit time (20*Tnon-select), and fifty (50) times of non-select unit time (50*Tnon-select). The reflectivity curve with 0*Tnon-select indicates the image quality in the prior art. By trial and error and repeated survey, from consumers' viewpoints, the image quality with eighteen (18) times of non-select unit time (18*Tnon-select) is acceptable.

To sum up, the present invention provided a cholesteric liquid crystal display device and a driving method for improving non-uniform image quality of the cholesteric liquid crystal display device. After liquid crystal driving unit addresses (scans) a plurality of row electrode lines by outputting the select voltages in sequence, it takes more than eighteen (18) times of scan unit time for the liquid crystal driving unit to apply non-select voltages to a plurality of row electrode lines. Thus, the cholesteric liquid crystal display device has much more uniform brightness, and much more uniform image quality as well.

The descriptions illustrated above set forth simply the preferred embodiments of the present invention; however, the characteristics of the present invention are by no means restricted thereto. All changes, alterations, or modifications conveniently considered by those skilled in the art are deemed to be encompassed within the scope of the present invention set forth by the following claims.

What is claimed is:

1. A cholesteric liquid crystal display device, comprising:
    a cholesteric liquid crystal display panel, comprising a plurality of column electrode lines (columns) and a plurality of row electrode lines (rows); and
    a liquid crystal driving unit, electrically coupled to the cholesteric liquid crystal display panel and outputting column driving voltages to the column electrode lines, and applying row driving voltages to scan the row electrode lines in sequence, and taking a scan unit time to scan a row electrode line, and the row driving voltages comprising a select voltage and a non-select voltage;
    wherein it takes more than eighteen (18) times of the scan unit time for the liquid crystal driving unit to address the row electrode lines by the non-select voltage after the row electrode lines are addressed by the liquid crystal driving unit.

2. The cholesteric liquid crystal display device according to claim 1, wherein the cholesteric liquid crystal display panel is a Passive Matrix addressed cholesteric liquid crystal display panel.

3. A cholesteric liquid crystal display device, comprising:
    a cholesteric liquid crystal display panel, comprising a plurality of column electrode lines (columns) and a plurality of row electrode lines (rows); and
    a liquid crystal driving unit, electrically coupled to the cholesteric liquid crystal display panel and further comprising a control module, and outputting column driving voltages to the column electrode lines and applying row driving voltages to scan the row electrode lines in sequence, and taking a scan unit time to scan a row electrode line, and the row driving voltages comprising a select voltage and a non-select voltage;
    wherein it takes a modification time increment for the control module to address the row electrode lines by the non-select voltage after the row electrode lines are addressed by the liquid crystal driving unit, and the modification time increment is more than eighteen times of the select unit times.

4. The cholesteric liquid crystal display device according to claim 3, wherein the cholesteric liquid crystal display panel is a Passive Matrix addressed cholesteric liquid crystal display panel.

5. A driving method for improving non-uniform image quality of a cholesteric liquid crystal display device which has a liquid crystal driving unit and a cholesteric liquid crystal display panel which has a plurality of column electrode lines and a plurality of row electrode lines, the method comprising the steps of:
    outputting column driving voltages to the column electrode lines while the row electrode lines are addressed by the row driving voltages in sequence, taking a scan unit time to scan a row electrode line, and the row driving voltage having a select voltage and a non-select voltage; and
    taking a modification time increment more than eighteen times of the select unit times to address the row electrode lines by the non-select voltage after the row electrode lines are addressed by the liquid crystal driving unit.

6. The driving method according to claim 5, wherein the cholesteric liquid crystal display panel is a Passive Matrix addressed cholesteric liquid crystal display panel.

* * * * *